(12) United States Patent
Fukuda (10) Patent No.: US 10,282,527 B2
(45) Date of Patent: May 7, 2019

(54) INFORMATION PROCESSING APPARATUS, INFORMATION PROCESSING METHOD, PROGRAM, STORAGE MEDIUM, AND PASSWORD ENTRY APPARATUS

(71) Applicant: Rakuten, Inc., Tokyo (JP)

(72) Inventor: Eiji Fukuda, Setagaya-ku (JP)

(73) Assignee: Rakuten, Inc., Tokyo (JP)

( * ) Notice: Subject to any disclaimer, the term of this patent is extended or adjusted under 35 U.S.C. 154(b) by 243 days.

(21) Appl. No.: 15/307,413

(22) PCT Filed: Apr. 30, 2014

(86) PCT No.: PCT/JP2014/061945
§ 371 (c)(1),
(2) Date: Oct. 28, 2016

(87) PCT Pub. No.: WO2015/166552
PCT Pub. Date: Nov. 5, 2015

(65) Prior Publication Data
US 2017/0054699 A1 Feb. 23, 2017

(51) Int. Cl.
*G06F 21/31* (2013.01)
*G06F 21/45* (2013.01)
*H04L 29/06* (2006.01)

(52) U.S. Cl.
CPC .............. *G06F 21/31* (2013.01); *G06F 21/45* (2013.01); *H04L 63/083* (2013.01); *H04L 63/0876* (2013.01)

(58) Field of Classification Search
CPC ... H04L 63/06; H04L 63/0876; H04L 63/083; G06F 21/31; G06F 21/45
See application file for complete search history.

(56) References Cited

U.S. PATENT DOCUMENTS

| 5,611,048 | A | * | 3/1997 | Jacobs | G06F 21/31 711/164 |
| 8,365,245 | B2 | * | 1/2013 | Childress | G06F 21/31 5/17 |
| 9,699,173 | B1 | * | 7/2017 | Roth | H04L 63/0846 |
| 2006/0271789 | A1 | * | 11/2006 | Satomura | G06F 21/41 713/183 |

(Continued)

FOREIGN PATENT DOCUMENTS

| JP | 4-253255 A | 9/1992 |
| JP | 2005-050121 A | 2/2005 |

(Continued)

OTHER PUBLICATIONS

Scarfone et al. Guide to Enterprise Password Management (Draft) NIST special publication 800-118, Apr. 2009, NIST, pp. 1-40.*

(Continued)

*Primary Examiner* — Robert B Leung
*Assistant Examiner* — Thomas Ho
(74) *Attorney, Agent, or Firm* — Sughrue Mion, PLLC (57) ABSTRACT

An information processing apparatus that generates a second password different from a first password in response to a password change request from a terminal, and generates and sends a change screen page to the terminal, stores the first password as an old password, and sends a notification when an authentication is attempted using the old password.

5 Claims, 5 Drawing Sheets (56) References Cited

U.S. PATENT DOCUMENTS

| | | | |
|---|---|---|---|
| 2007/0169178 A1* | 7/2007 | Keohane | H04L 63/0846 726/4 |
| 2007/0220270 A1* | 9/2007 | Murakami | G06F 21/35 713/183 |
| 2008/0104411 A1* | 5/2008 | Agrawal | H04L 63/0846 713/183 |
| 2009/0199294 A1* | 8/2009 | Schneider | G06F 21/316 726/18 |
| 2009/0300734 A1 | 12/2009 | Hiramoto | |
| 2010/0308109 A1* | 12/2010 | Maddocks | G06Q 20/341 235/382.5 |
| 2013/0227668 A1* | 8/2013 | Mocanu | G06F 21/41 726/8 |
| 2014/0150117 A1 | 5/2014 | Yamahara | |

FOREIGN PATENT DOCUMENTS

| | | |
|---|---|---|
| JP | 2006-185330 A | 7/2006 |
| JP | 2009-294746 A | 12/2009 |
| JP | 2012-252425 A | 12/2012 |

OTHER PUBLICATIONS

"Windows Support" https://support.microsoft.com/en-us/help/2845626/cached-credentials-are-not-updated-when-you-change-your-password-in-wi, Oct. 9, 2013.*

International Search Report of PCT/JP2014/061945 dated Jul. 15, 2014 [PCT/ISA/210].

* cited by examiner

INFORMATION PROCESSING APPARATUS, INFORMATION PROCESSING METHOD, PROGRAM, STORAGE MEDIUM, AND PASSWORD ENTRY APPARATUS

CROSS REFERENCE TO RELATED APPLICATIONS

This application is a National Stage of International Application No. PCT/JP2014/061945, filed Apr. 30, 2014, the contents of which are incorporated herein by reference in its entirety.

TECHNICAL FIELD

The present invention relates to an information processing apparatus, an information processing method, a program, a storage medium and a password entry apparatus where a password used commonly by a plurality of persons.

BACKGROUND ART

In the related art, in a web site that handles user's individual information such as an EC (Electronic Commerce) site, a user has been authenticated using a password for privacy protection (for example, see Patent Document 1 below).

Patent Document 1: Japanese Patent Application Laid-open No. 2012-252425

SUMMARY OF INVENTION

Problems to be solved by the Invention

When one user is authenticated per company or group, a password can be used commonly by a plurality of persons belonging to one company or the like. In the related art, handling of the password commonly used by a plurality of persons has not been studied in detail.

In view of the circumstances as described above, an object of the present invention is to provide an information processing apparatus, an information processing method, a program, a storage medium and a password entry apparatus where handling of a password used commonly by a plurality of persons is facilitated.

Means for solving the Problems

For attaining the object described above, an information processing apparatus according to one embodiment of the present invention includes a communication unit; a storage unit; and a control unit.

The communication unit is configured to be capable of communicating with a terminal.

The storage unit stores a first password for user authentication.

The control unit, controls the communication unit such that, in response to a change request of a first password from a terminal, a second password different from the first password is generated, a change screen page to which change user identification information for identifying a user of a change request source is capable of entering is generated, and the change screen page is sent to the terminal;

controls the storage unit such that, when the second password and the change user identification information entered via the change screen page are received, the first password is updated to the second password, and the first password is stored as an old password in connection with the change user identification information; and controls the communication unit such that, it determines whether or not a password for authentication received from the terminal after the update is matched with the second password, when the password received is not matched with the second password, it determines whether or not the password received is matched with the old password, when the password received is matched with the old password, notification information showing a password change including the change user identification information in connection with the old password is sent to the terminal.

By the above-described configuration, the notification information can be sent to a user who is one of a plurality of the users sharing one password and enters the old password without knowing the password change. In this way, the user who acquired the notification information can be in contact with the user who changed the password, and can acquire a changed password. It is therefore possible to facilitate the handling of the password commonly used by a plurality of persons.

The storage unit may further store a plurality of old passwords used for former authentication, and the control unit may control the communication unit such that, when it determines whether or not the password for authentication received is matched with at least one of a plurality of old passwords and it is determined that the password received is matched with at least any one of a plurality of old passwords, the notification information is sent to the terminal.

In this way, it is possible to send the notification information showing the password change including the change user identification information in connection with the first password (old password) to the user who does not know the first and second passwords and knows only the password used before the first password.

In this case, a plurality of the old passwords may be those used for authentication before when a predetermined period.

This allows a greater number of a plurality of the old passwords to be stored as the changing frequency is high. When the changing frequency is high, it is contemplated that the password may be changed a plurality of times without notifying every person. By the above-described configuration, the user who knows only the password a plurality of times before the first password can be notified of the change user identification information etc. On the other hand, when the changing frequency is low, a frequent password change is not done, and only the user who knows the first password or the password before several times can be notified of the change user identification information etc. Thus, the user of which the change user identification information etc. is notified can be adequately limited based on the changing frequency.

In addition, the control unit may control the storage unit such that identification information in the terminal of the change request source of the first password is stored as identification information in a first terminal, may control the storage unit such that identification information in the terminal of a receiving source of the password after the update is stored as identification information in a second terminal, and may control the communication unit such that, when the password received is matched with the old password, it determines whether or not the identification information in the first terminal is matched with the identification information in the second terminal, and it is determined that they are not matched, the notification information is sent to the terminal.

In this way, the notification information can be sent to the terminal other than the terminal where the password is changed to the second password. In other words, the notification information is not sent to the terminal used by the user who changes the password to the second password, thereby avoiding the above-described bothersome.

An information processing method according to other embodiment of the present invention includes the steps of:

generating, in response to a change request of a first password for user authentication from a terminal, a second password different from the first password and a change screen page to which change user identification information for identifying a user of a change request source is capable of entering to send the change screen page to the terminal;

updating the first password to the second password when the second password and the change user identification information entered via the change screen page are received to store the first password as an old password in connection with the change user identification information;

determining whether or not the password for authentication received from the terminal after the update is matched with the second password;

determining, when the password received is not matched with the second password, whether or not the password received is matched with the old password; and sending, when the password received is matched with the old password, notification information showing a password change including the change user identification information in connection with the old password to the terminal.

A program according to still other embodiment of the present invention that causes an information processing apparatus to execute the steps of:

generating, in response to a change request of a first password for user authentication from a terminal, a second password different from the first password and a change screen page to which change user identification information for identifying a user of a change request source is capable of entering to send the change screen page to the terminal;

updating the first password to the second password when the second password and the change user identification information entered via the change screen page are received to store the first password as an old password in connection with the change user identification information;

determining whether or not the password for authentication received from the terminal after the update is matched with the second password;

determining, when the password received is not matched with the second password, whether or not the password received is matched with the old password; and sending, when the password received is matched with the old password, notification information showing a password change including the change user identification information in connection with the old password to the terminal.

A storage medium according to still other embodiment of the present invention records a program that causes an information processing apparatus to execute the steps of:

generating, in response to a change request of the first password for user authentication from a terminal, a second password different from the first password and a change screen page to which change user identification information for identifying a user of a change request source is capable of entering to send the change screen page to the terminal;

updating the first password to the second password when the second password and the change user identification information entered via the change screen page are received to store the first password as an old password in connection with the change user identification information;

determining whether or not the password for authentication received from the terminal after the update is matched with the second password;

determining, when the password received is not matched with the second password, whether or not the password received is matched with the old password; and sending, when the password received is matched with the old password, notification information showing a password change including the change user identification information in connection with the old password to the terminal.

A password entry apparatus according to still other embodiment of the present invention includes a storage unit; a display unit; and a control unit.

The storage unit is configured to store a first password for user authentication.

The display unit is configured to be capable of displaying an image.

The control unit is configure to control the display unit such that a second password different from a first password and a change screen page to which change user identification information for identifying a user are displayed, control the storage unit such that, when the second password and the change user identification information are entered via the change screen page, the first password is updated to the second password, and the first password is stored as an old password in connection with the change user identification information, and control the display unit such that, when it determines whether or not the password for authentication entered after the update is matched with the second password and the password entered is not matched with the second password, and when it determines whether or not the password entered is matched with the old password and the password entered is matched with the old password, a notification screen page showing a password change including the change user identification information in connection with the old password is displayed.

By the above-described configuration, the notification screen page can be displayed to a user who is one of a plurality of the users sharing one password and enters the old password without knowing the password change. It is therefore possible to facilitate the handling of the password commonly used by a plurality of persons.

An information processing method, including the steps of:
controlling a storage unit such that
displaying a second password different from a first password for user authentication and a change screen page to which change user identification information for identifying a user is capable of entering;
updating the first password to the second password when the second password and the change user identification information are entered via the change screen page; and
storing the first password as an old password in connection with the change user identification information; and
controlling a display unit such that
determining whether or not the password for authentication entered after the update is matched with the second password;
determining, when the password entered is not matched with the second password, whether or not the password entered is matched with the old password; and displaying, when the password entered is matched with the old password, a notification screen page showing a password change including the change user identification information in connection with the old password.

As described above, the present invention can provide an information processing apparatus, an information processing method, a program, a storage medium and a password entry apparatus where handling of a password used commonly by a plurality of persons can be facilitated.

MODES FOR CARRYING OUT THE INVENTION

Hereinafter, embodiments of the present invention applied to the auction system will be specifically described with reference to the drawings.

[Configuration of System]

Figure 1:
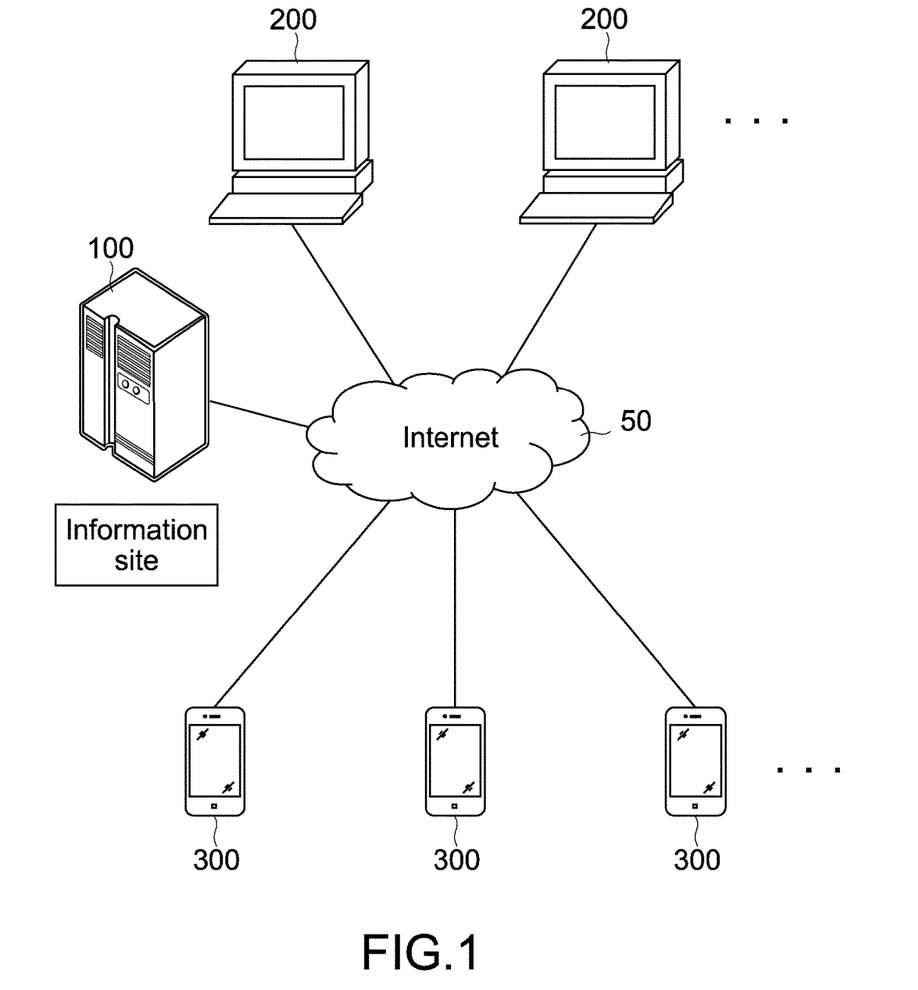
FIG. 1 A diagram showing a configuration of a wedding place information system according to a first embodiment of the present invention.

FIG. 1 is a diagram showing a configuration of an information system according to a present embodiment.

As shown in FIG. 1, the system includes a wedding place information server (information server, information processing apparatus) 100 and a plurality of the wedding place terminals (terminals) 200 on the Internet 50.

The information server 100 is a server managed by an operating company of a wedding place information site, and is connected to the wedding place terminals 200 of users receiving a wedding place information service and the user terminals 300 via the Internet 50.

The wedding place terminals 200 are terminal apparatuses used by a plurality of employees in a wedding place registered to a wedding place information site, and are PCs (Personal Computers), tablet PCs etc., for example. The wedding place terminals 200 are used by a plurality of employees in the same wedding place. Note that the respective employees are also referred to as "users" of the wedding place terminals 200 in the following description.

The information server 100 generates a web page (HTML (HyperText Markup Language) document) where wedding place information can be edited, and replies to the wedding place terminals 200 in response to an access request from the wedding place terminals 200 to the wedding place information site.

The wedding place terminals 200 access the information server 100, receive the web page, and display the web page on screens by browsers. The accesses from the wedding place terminals 200 to the information server 100 need authentication using wedding place IDs and passwords determined per wedding place. In other words, a plurality of the employees in the same wedding place can access the above-described site using the same password from different wedding place terminals 200.

Respective users using a plurality of the wedding place terminals 200 can update information about the wedding place belonging to the users themselves via the screens displayed by the above-described browsers. In addition, the wedding place terminals 200 can access the information server 100, and can acquire information about tour reservation statuses, reservation persons, etc. of the own wedding places from the user terminals 300.

The user terminals 300 are operated by the users receiving the wedding place information service, and are PCs, smart phones, mobile phones, tablet PCs etc. for example. The user terminals 300 can access the information server 100, browse information about the specific wedding places, or reserve the wedding place.

[Hardware Configuration of Information Server]

Figure 2:
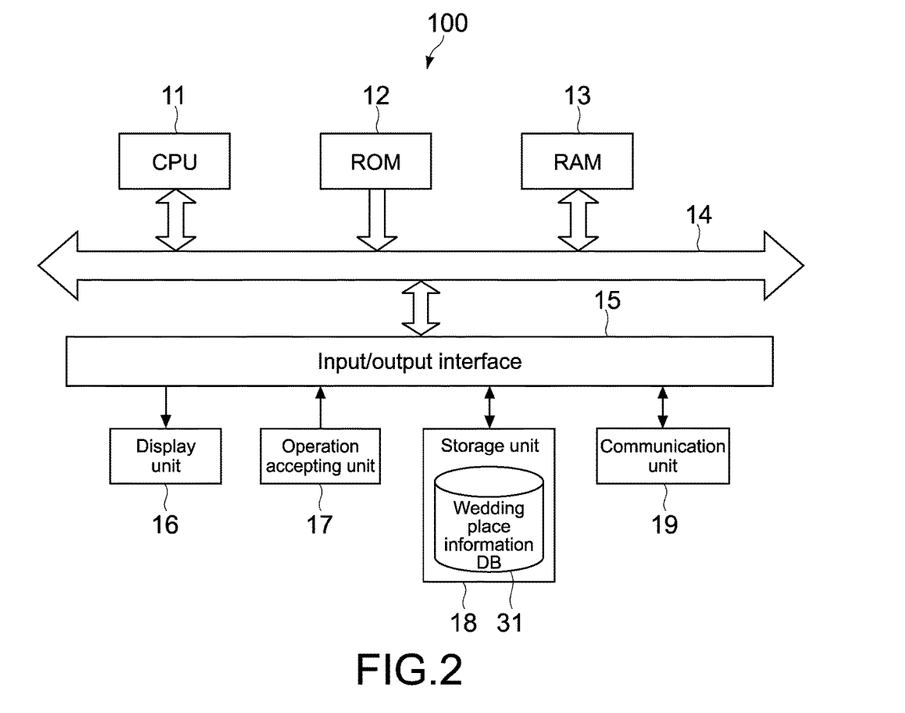
FIG. 2 A diagram showing a hardware configuration of a wedding place information server in the above-described system.

FIG. 2 is a diagram showing a hardware configuration of the wedding place information server 100. As shown in FIG. 2, the information server 100 includes a CPU (Central Processing Unit) 11, a ROM (Read Only Memory) 12, a RAM (Random Access Memory) 13, an input/output interface 15, and a bus 14 connecting them.

The CPU 11 accesses the RAM 13 etc. as appropriate and necessary, and controls all blocks of the information server 100 while performing a variety of arithmetic processing. The ROM 12 is a non-volatile memory where firmware such as programs and a variety of parameters is stationary stored. The RAM 13 is used as a working area of the CPU 11, and temporarily holds an OS, a variety of applications under execution, and a variety of data under processing.

To the input/output interface 15, a display unit 16, an operation accepting unit 17, a storage unit 18, a communication unit 19 etc. are connected.

The display unit 16 is a display device using an LCD (Liquid Crystal Display), an OELD (Organic ElectroLuminescence Display), a CRT (Cathode Ray Tube), etc. for example.

The operation accepting unit 17 is an entry apparatus such as a pointing device, e.g., a mouse, a key board, a touch panel, and other entry apparatuses. When the operation accepting unit 17 is a touch panel, the touch panel can be integrated with the display unit 16.

The storage unit 18 is a non-volatile memory such as an HDD (Hard Disk Drive), a flash memory (SSD; Solid State Drive), and other solid memory. In the storage unit 18, the OS, a variety of applications, and a variety of data are stored.

The communication unit 19 is an NIC (Network Interface Card) for Ethernet, and is responsible for communication between each wedding place terminal 200 and each user terminal 300.

[Hardware Configuration of Wedding Place Terminal]

Figure 3:
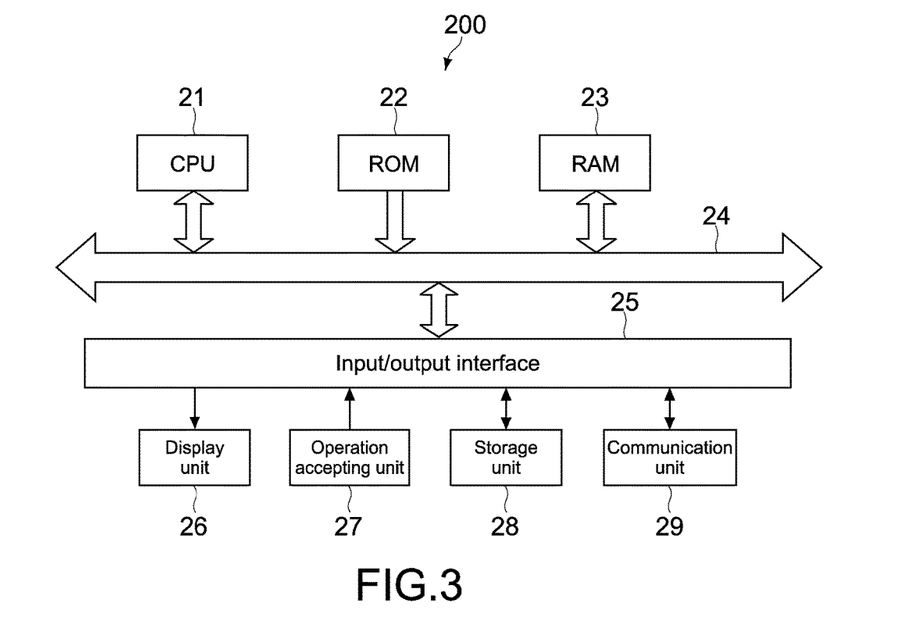
FIG. 3 A diagram showing a hardware configuration of a wedding place information terminal in the above-described system.

FIG. 3 is a diagram showing a hardware configuration of the wedding place information terminal 200. As shown in FIG. 3, the hardware configuration of the wedding place terminal 200 is basically similar to the hardware configuration of the information server 100.

Specifically, the wedding place terminal 200 includes a CPU 21, a ROM 22, a RAM 23, an input/output interface 25, a bus 24 for connecting them, a display unit 26, an operation accepting unit 27, a storage unit 28, and a communication unit 29. Here, the display unit 26 may be externally connected to the wedding place terminal 200. As the storage unit 28, an HDD (Hard Disk Drive) may be used.

The CPU 21 controls each block such as the storage unit 28 and the communication unit 29, and executes communication processing to the information server 100 and a variety of data processing.

The operation accepting unit 27 is a pointing device, e.g., a mouse, a key board, a touch panel, or other entry apparatus. When the operation accepting unit 27 is a touch panel, the touch panel can be integrated with the display unit 26.

The storage unit 28 is, for example, a flash memory, and stores the OS, a variety of software such as browsers, and a variety of data for executing them.

The communication unit 29 is an NIC for Ethernet, and is responsible for communication with the information server 100.

Although not shown, the hardware configuration of each user terminal 300 is similar to that of each wedding place terminal 200.

[Database Configuration of Information Server]

As shown in FIG. 2, the storage unit 18 of the information server 100 includes a wedding place information database 31.

The wedding place information database 31 stores a wedding place name, an authentication ID, a password, other information about the wedding place (an address, a wedding plan, a price, an evaluation of the wedding place) per wedding place. The wedding place information database 31 stores a first password for authenticating employees (users) of each wedding place as a password of each wedding place.

[Operation of Information Server]

Next, an operation of the information server 100 configured as described above will be described. The operation is executed by cooperating hardware such as the CPU 11 and the communication unit 19 of the information server 100 and software stored in the storage unit 18 of the information server 100. In the following description, the CPU 11 is defined as an operation subject as a matter of convenience.

Figure 4:
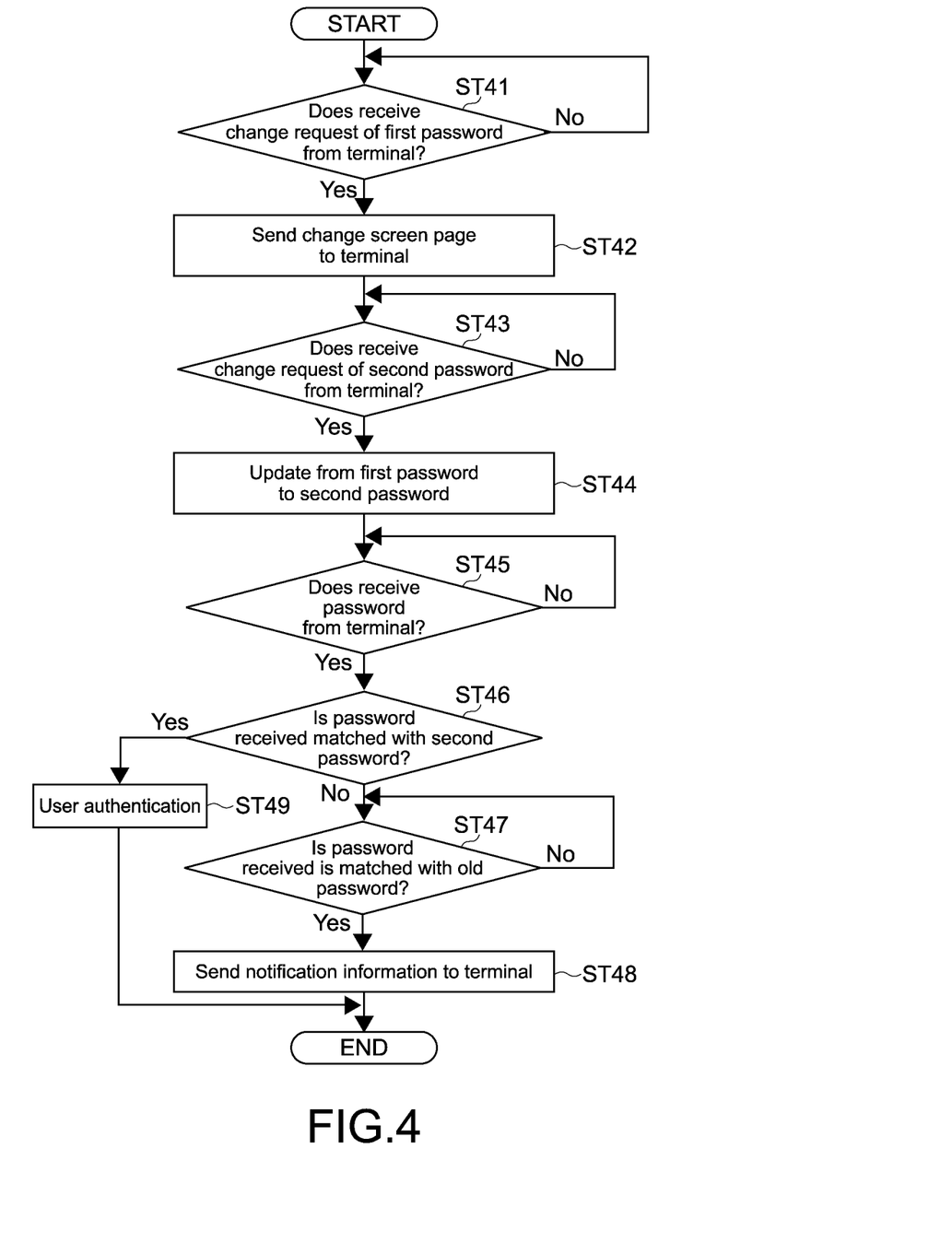
FIG. 4 A flow chart showing an operation example of the wedding place information server.

FIG. 4 is a flow chart showing an operation example of the wedding place information server 100. Here, it is assumed that a user who is an employee of a wedding place changes a password for logging in the wedding place information site by the wedding place terminal 200, and then other user who is an employee of the wedding place tries to log in the wedding place terminal 200 by the password before changing.

As shown in FIG. 4, the CPU 11 of the information server 100 determines whether or not the communication unit 19 receives the change request of the first password from the wedding place terminal 200 (Step 41). When it is determined as received (Yes in Step 41), the CPU 11 generates a second password different from the first password and a change screen page on which an entry of change user identification information for identifying a user of a change request source is possible, and controls the communication unit 19 such that the change screen page is sent to the wedding place terminal 200 (Step 42).

The change user identification information can specify the user of the change request source in a group sharing the password, and can include a user name, an employee ID, a nickname etc.

Figure 5:
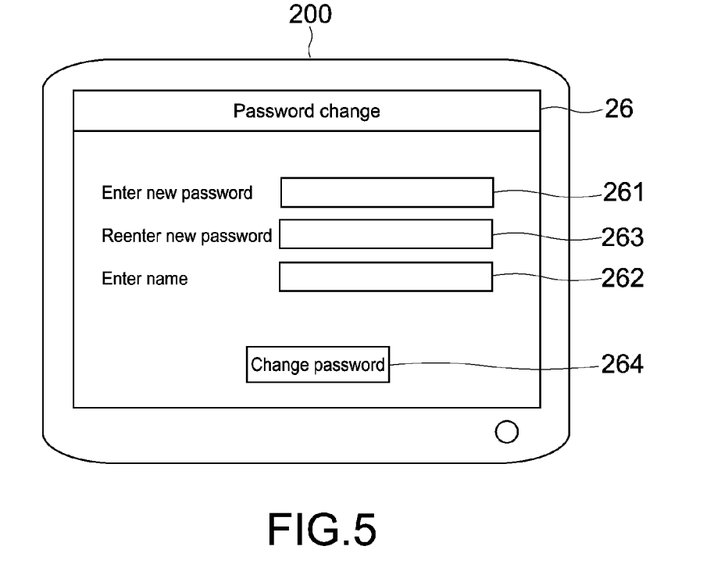
FIG. 5 A diagram showing a change screen page displayed on the wedding place information terminal.

FIG. 5 is an illustrative change screen page displayed on the display unit 26 of the wedding place information terminal 200. As shown in FIG. 5, the change screen page includes a new password entry field 261 on which an entry of the second password is possible, and an entry field 262 of the change user identification information using the wedding place terminal 200. The change user identification information is a user name, for example. In addition, the change screen page may include a new password reentry field 263 for confirming the second password.

The user of the wedding place terminal 200 changes the password by entering the second password and the change user identification information to entry fields 261, 262, 263, and clicking a password change button 264. Note that the change screen page is not limited to the above, and may be a screen page on which the entries of at least the second password and the change user identification information are possible.

Next, the CPU 11 of the information server 100 determines whether or not the second password and the change user identification information entered via the change screen page are received (Step 43). When it is determined as received (Yes in Step 43), the CPU 11 updates from the first password to the second password, and controls the storage unit 18 such that the first password is stored as the old password in connection with the change user identification information (Step 44).

Next, the CPU 11 of the information server 100 determines whether or not the password for authentication is received from the wedding place terminal 200 after the update (Step 45). When it is determined as received (Yes in Step 45), the CPU 11 determines whether or not the password received is matched with the second password (Step 46).

When it is matched with the second password (Yes in Step 46), the CPU 11 authenticates the user (Step 49), and processing is ended.

On the other hand, when it is not matched with the second password (No in Step 46), the CPU 11 determines whether or not the password for authentication received is matched with the old password (Step 47).

When it is matched with the old password (Yes in Step 47), the CPU 11 controls the communication unit 19 such that the notification information showing a password change including the change user identification information in connection with the old password is sent to the wedding place terminal 200 (Step 48).

The notification information may be a notification screen page showing the password change including the change user identification information, or may be sound data showing the password change including the change user identification information. Alternatively, the notification information may be information including a command for generating the notification screen page or the sound data.

As described above, according to the present embodiment, it is possible to send the notification information to the user among a plurality of the users sharing one password who entered the old password without knowing the password change. In this way, the user who acquired the notification information can be in contact with the user who changed the password, and can acquire a changed password. It is therefore possible to avoid confusion accompanied by insufficient recognition of the password change, when a plurality of the users manage one password.

Furthermore, the notification information is sent when the password received after the update is matched with the old password, thereby notifying only the user who changed the password and the user sharing the old password of the information. Accordingly, it can decrease a risk of leaking the individual information and the password.

<Second Embodiment>

The present invention is not only applied to the system including the 100 and the terminal 200, but also to a password entry apparatus described below.

A password entry apparatus (entry apparatus) 400 is an electronic device for performing user authentication using a password upon a predetermined operation, and is a PC, a table PC, etc., for example. The predetermined operation is not especially limited, may be a user authentication operation when the entry apparatus 300 is started, or may be a user authentication operation when personal settings in a PC are changed. The entry apparatus 400 is used commonly by a plurality of users, and the users can use the common password for user authentication.

[Hardware Configuration of Password entry Apparatus]

Figure 6:
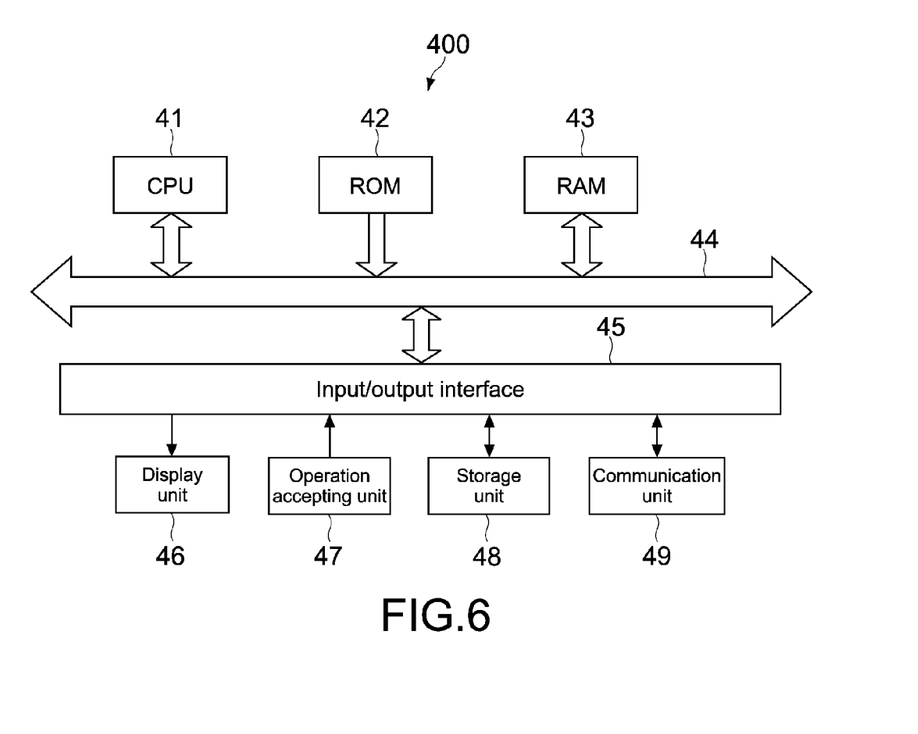
FIG. 6 A diagram showing a hardware configuration of a password entry apparatus according to a second embodiment of the present invention.

FIG. 6 is a diagram showing a hardware configuration of the entry apparatus 400. As shown in FIG. 6, a hardware configuration of the entry apparatus 400 is basically similar to the hardware configurations of the information server 100 and the wedding place terminal 200.

Specifically, the entry apparatus 400 includes a CPU 41, a ROM 42, a RAM 43, an input/output interface 45, a bus 44 for connecting them, a display unit 46, an operation accepting unit 47, a storage unit 48, and a communication unit 49. Here, the display unit 46 may be externally connected to the entry apparatus 400. As the storage unit 48, an HDD may be used.

The CPU 41 controls each block such as the storage unit 48 and the communication unit 49, and executes a variety of data processing.

The display unit 46 is a display device using an LCD, an OELD, a CRT, etc. for example, and is configured such that images can be displayed.

The storage unit 48 is a non-volatile memory such as an HDD, a flash memory, and other solid memory, and stores a first password for user authentication.

[Operation of Password entry Apparatus]

Next, the entry apparatus 400 configured as described above will be described. The operation is executed by cooperating hardware such as the CPU 41, the display unit 46 and the operation accepting unit 47 of the entry apparatus 400 and software stored in the storage unit 48 of the entry apparatus 400. In the following description, the CPU 41 is defined as an operation subject as a matter of convenience.

Figure 7:
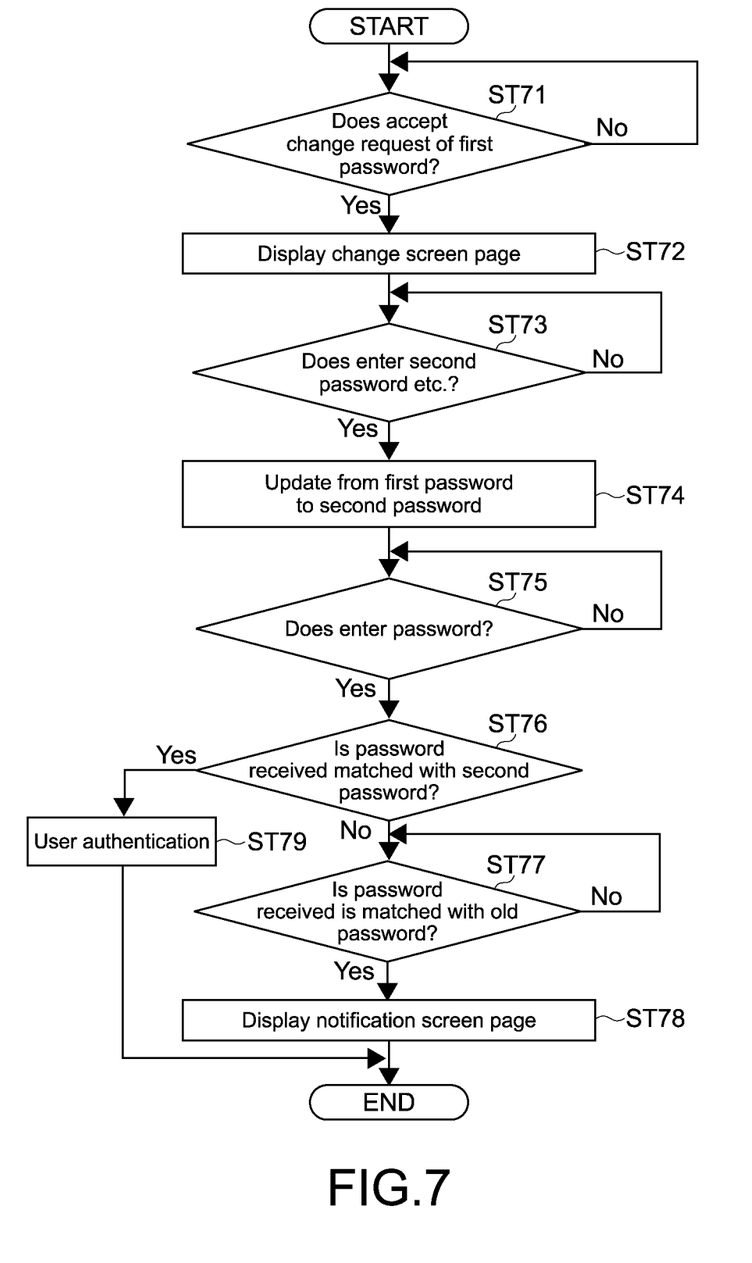
FIG. 7 A flow chart showing an operation example of the password entry apparatus.

FIG. 7 is a flow chart showing an operation example of the password entry apparatus 400. Here, it is assumed that a user among a plurality of users who use the entry apparatus 400 changes a password for user authentication, and then other user among a plurality of the users enters a password for user authentication.

As shown in FIG. 7, the CPU 41 determines whether or not the operation accepting unit 47 accepts the change request of the first password (Step 71). When it is determined as accepted (Yes in Step 71), the CPU 41 controls the display unit 46 such that a second password different from the first password and a change screen page to which change user identification information for identifying a user is capable of entering is displayed (Step 72). In this manner, the change screen page shown in FIG. 5 is displayed on the display unit 46.

Then, the CPU 41 determines whether or not the second password and the change user identification information are entered (Step 73). When it is determined as entered (Yes in Step 73), the CPU 41 updates from the first password to the second password, and controls the storage unit 48 such that the first password is stored as the old password in connection with the change user identification information (Step 74).

Next, the CPU 41 determines whether or not the password for authentication is entered from the operation accepting unit 47 after the update (Step 75). When it is determined as entered (Yes in Step 75), the CPU 41 determines whether or not the password entered is matched with the second password (Step 76).

When it is matched with the second password (Yes in Step 76), the CPU 41 authenticates the user (Step 79), and processing is ended.

On the other hand, when it is not matched with the second password (No in Step 76), the CPU 41 determines whether or not the password entered for authentication is matched with the old password (Step 77).

When it is matched with the old password (Yes in Step 77), the CPU 41 controls the display unit 46 such that the notification screen page showing a password change including the change user identification information in connection with the old password is displayed (Step 78).

As described above, according to the present embodiment, it is possible to display the notification screen page for the user among a plurality of the users sharing one password who entered the old password without knowing the password change. It is therefore possible to avoid confusion accompanied by insufficient recognition of the password change, when a plurality of the users manage one password. Furthermore, the notification screen page can be displayed only to the user who changed the password and the user sharing the old password. Accordingly, it can decrease the risk of leaking the individual information and the password.

[Modification]

The present invention is not limited to the above-described embodiments, and various modifications and alterations may be made without departing from the scope and spirit of this invention.

In the above-described first embodiment, the storage unit 18 further stores a plurality of the old passwords used for the former authentication, and CPU 11 may control the communication unit 19 such that, when it determines whether or not the password for authentication received is matched with at least one of a plurality of old passwords and it is determined that the password received is matched with at least any one of a plurality of old passwords, the notification information is sent to the wedding place terminal 200.

Similarly, in the above-described second embodiment, the storage unit 48 further stores a plurality of the old passwords used for the former authentication, and may control the display unit 46 such that, when it determines whether or not the password for authentication received is matched with at least one of a plurality of old passwords and it is determined that the password received is matched with at least any one of a plurality of old passwords, the notification screen page is displayed.

In this manner, it is possible to send or display the notification information showing the password change including the change user identification information in connection with the first password (old password) to the user who does not know the first and second passwords and knows only the password used before the first password.

In this case, when the password received is not matched with the old password, it may be determined whether or not it is matched with the old password one time before the first password. This processing may be repeated until it is matched with the old password n (predetermined natural numbers) times before the first password.

In other words, the storage units 18 and 48 may further each store the password used for authentication k time before the first password as the old password k times before, where k=1, 2, ..., n (n is a predetermined natural number) other than the old password (first password). The CPU 11 according to the first embodiment may control the communication unit 19 such that, when the password received for authentication is not matched with the old password (k−1) times before, it determines whether or not it is matched with the old password k times before and it is determined as matched, the notification information is sent to the wedding place terminal 200.

Similarly, the CPU 41 according to the second embodiment may control the display unit 46 such that, when the password received for authentication is not matched with the old password (k−1) times before, it determines whether or not it is matched with the old password k times before, and when it is determined as matched, the notification screen page is displayed.

Furthermore, the storage units 18 and 48 each stores the changing frequency of a plurality of the old passwords. The higher the changing frequency is, the greater the CPUs 11 and 41 may each determine the value of n may be. In this case, the storage units 18 and 48 may each store the changing frequency in connection with the value of n.

When the changing frequency is high, it is contemplated that the password may be changed a plurality of times without notifying every person. By the above-described configuration, the user who knows only the password before a plurality of times of the first password can be notified of the change user identification information etc. On the other hand, when the changing frequency is low, a frequent password change is not done, and only the user who knows the first password or the password before several times can be notified of the change user identification information etc. Thus, by the above-described configuration, the user of which the change user identification information etc. is notified can be adequately limited based on the changing frequency.

Alternatively, a plurality of the old passwords may be used for authentication before a predetermined period.

In this manner, the higher the changing frequency is, the greater a plurality of the old passwords can be stored. Accordingly, the users of which the change user identification information is notified can be limited as appropriate. While the risk of leaking the password is decreased, the second password can be easily acquired.

In the above-described first embodiment, the wedding place terminals 200 may be the same wedding place terminals 200, or may be different wedding place terminals 200.

In the above-described first and second embodiments, a difference between the user who changed to the second password and the user who entered the password after the update is not especially limited. In this case, when the user who changed to the second password enters by mistake the first password that is the old password, the change user identification information of the user of interest can be notified. In this manner, when the user who forgot the change of the password, it can provide an opportunity to recall the password after the change.

When it is bothersome to notify the user who changed to the second password of the change user identification information, the information server 100 may be configured as described below.

Specifically, the CPU 11 may control the storage unit 18 such that identification information in the wedding place terminal 200 of the change request source of the first password is stored as the identification information in the first terminal, may control the storage unit 18 such that the identification information in the wedding place terminal 200 of the receiving source of the password after the update is stored as the identification information in the second terminal, and may control the communication unit 19 such that, when the password received is matched with the old password, it determines whether or not the identification information in the first terminal is matched with the identification information in the second terminal, and when it is determined that they are not matched, the notification information is sent to the wedding place terminal 200. The identification information in the terminals may be an IP (Internal Protocol) address or a MAC (Media Access Control) address, for example.

In this way, the notification information can be sent to the terminal other than the terminal where the password is changed to the second password. In other words, the notification information is not sent to the terminal used by the user who changes the password to the second password, thereby avoiding the above-described bothersome.

In addition, in the above-described second embodiment, although it describes that the CPU 41 controls the display unit 46 such that, when the password entered is matched with the old password, the notification screen page is displayed, it is not limited thereto. For example, the password entry apparatus 400 may include a speaker unit from which voice data can be outputted, and the CPU 41 may control the speaker unit such that, when the password entered is matched with the old password, the notification information showing the password change including the change user identification information in connection with the old password is outputted as the sound data.

In the above-described first embodiment, the "terminal" according to the present invention is illustrated by the wedding place terminal 200. However, the present invention is not limited thereto, and the "terminal" may be the user terminal 300.

In the above-described embodiments, the present invention is applied to the wedding place information system as an example. But, the present invention is not limited thereto, and may be applied to any system including an internet shopping, an internet banking, an internet stock brokerage, a reservation of a facility on the Internet, as long as the user and the terminal used are needed for authentication.

DESCRIPTION OF REFERENCE NUMERALS

11, 41 CPU
16, 46 display unit
18, 48 storage unit
19, 49 notification unit
50 internet
100 wedding place information server
200 wedding place terminal (terminal)
300 user terminal
400 password entry apparatus

The invention claimed is:

1. An information processing apparatus, comprising:
a communication unit, comprising a network card, wherein the communication unit is configured to communicate, using the network card, with a plurality of terminals, wherein the plurality of terminals includes a first terminal;
a first memory configured to store a first password for user authentication;
at least one second memory configured to store computer program code; and
at least one processor, which the at least one processor is configured to access the at least one second memory and operate according to the computer program code, wherein the computer program code includes:
first storing code causing the at least one processor to store in the first memory, in response to a change request of the first password, terminal identification information of a first terminal, wherein the change request is from the first terminal and a plurality of terminals includes the first terminal,
generation code causing the at least one processor to generate a change screen page to accept a second password different from the first password and accept user identification information for identifying a user of the first terminal,
first sending code causing the at least one processor to send, via the communication unit, the change screen page to the first terminal,
updating code causing the at least one processor to update the first password to the second password, when the second password and the change user identification information entered via the change screen page are received,
second storing code causing the at least one processor to store the first password as a first old password in association with the change user identification information in the first memory,
first determining code causing the at least one processor to determine, when a password for authentication from a second terminal of the plurality of terminals is received after the first password is updated to the second password, whether or not the received password matches the second password,
second determining code causing the at least one processor to determine, when the received password does not match the second password, whether or not the received password matches the first old password,
third determining code causing the at least one processor to determine, when the received password matches the first old password, whether or not terminal identification information of the second terminal matches the stored identification information of the first terminal, and
second sending code causing the at least one processor to send via the communication unit, when the received password matches the first old password and when the second terminal identification information does not match the stored identification information of the first terminal, notification information showing a password change including the change user identification information associated with the first old password to the second terminal.

2. The information processing apparatus according to claim 1, wherein
the first memory is further configured to store a plurality of old passwords used for former authentication, wherein the plurality of old passwords includes the first old password.

3. The information processing apparatus according to claim 2, wherein
a plurality of the old passwords are those used for authentication within a predetermined period.

4. An information processing method, comprising:
storing, in response to a change request of a first password, terminal identification information of a first terminal in a first memory, wherein the change request is from the first terminal and a plurality of terminals includes the first terminal;
generating a change screen page to accept a second password different from the first password and accept user identification information for identifying a user of the first terminal;
sending the change screen page to the first terminal;
updating the first password to the second password, when the second password and the change user identification information entered via the change screen page are received;
storing the first password as a first old password in association with the change user identification information in the first memory;
determining, when a password for authentication from a second terminal of the plurality of terminals is received after the first password is updated to the second password, whether or not the received password matches the second password;
determining, when the received password does not match the second password, whether or not the received password matches the first old password;
determining, when the received password matches the first old password, whether or not terminal identification information of the second terminal matches the stored identification information of the first terminal; and
sending, when the received password matches the first old password and when the second terminal identification information does not match the stored identification information of the first terminal, notification information showing a password change in including the change user identification information associated with the first old password to the second terminal.

5. A non-transitory storage medium where a program is stored, the program that causes an information processing apparatus to execute the steps of:
storing, in response to a change request of a first password, terminal identification information of a first terminal in a first memory, wherein the change request is from the first terminal and a plurality of terminal includes the first terminal;
generating a change screen page to accept a second password different from the first password and accept user identification information for identifying a user of the first terminal;
sending the change screen page to the first terminal;
updating the first password to the second password, when the second password and the change user identification information entered via the change screen page are received;
storing the first password as a first old password in association with the change user identification information in the first memory;
determining, when a password for authentication from a second terminal of the plurality of terminals is received after the first password is updated to the second password, whether or not the received password matches the second password;
determining, when the received password does not match the second password, whether or not the received password matches the first old password;
determining, when the received password matches the first old password, whether or not terminal identification information of the second terminal matches the stored identification information of the first terminal; and
sending, when the received password matches the first old password and when the second terminal identification information does not match the stored identification of the first terminal, notification information showing a password change including the change user identification information associated with the first old password to the second terminal.

\* \* \* \* \*